(12) United States Patent
Legendre et al.

(10) Patent No.: US 8,364,404 B2
(45) Date of Patent: Jan. 29, 2013

(54) SYSTEM AND METHOD FOR DISPLAYING DATA ASSOCIATED WITH SUBSURFACE RESERVOIRS

(75) Inventors: Emmanuel Legendre, Houston, TX (US); Jacques R. Tabanou, Houston, TX (US); Jean Seydoux, Sugar Land, TX (US); Koji Ito, Sugar Land, TX (US); Fabienne Legendre, Houston, TX (US); Georgi Kutiev, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 416 days.

(21) Appl. No.: 12/027,155

(22) Filed: Feb. 6, 2008

(65) Prior Publication Data
US 2009/0198447 A1 Aug. 6, 2009

(51) Int. Cl.
G01V 3/38 (2006.01)
G01V 1/40 (2006.01)
G01V 3/18 (2006.01)
G01V 9/00 (2006.01)
(52) U.S. Cl. .................................. 702/5; 702/10; 702/11
(58) Field of Classification Search .................. None
See application file for complete search history.

(56) References Cited

U.S. PATENT DOCUMENTS

| | | | | |
|---|---|---|---|---|
| 4,357,660 A * | 11/1982 | Hepp | | 702/10 |
| 5,622,178 A * | 4/1997 | Gilham | | 600/523 |
| 5,934,391 A | 8/1999 | Cox | | |
| 6,446,006 B1 * | 9/2002 | Thore | | 702/5 |
| 6,487,901 B1 | 12/2002 | Keyes | | |
| 6,594,584 B1 * | 7/2003 | Omeragic et al. | | 702/9 |
| 6,668,650 B1 * | 12/2003 | Lafleur et al. | | 73/571 |
| 6,738,682 B1 * | 5/2004 | Pasadyn | | 700/100 |
| 6,829,649 B1 * | 12/2004 | Shorey et al. | | 709/235 |
| 6,970,397 B2 * | 11/2005 | Castagna et al. | | 367/73 |
| 2001/0022241 A1 * | 9/2001 | Portman et al. | | 175/61 |
| 2002/0133323 A1 * | 9/2002 | Dahlberg | | 703/10 |
| 2006/0041409 A1 | 2/2006 | Strebelle et al. | | |
| 2006/0090934 A1 * | 5/2006 | Williams | | 175/45 |
| 2007/0168133 A1 | 7/2007 | Bennett et al. | | |

FOREIGN PATENT DOCUMENTS

| | | |
|---|---|---|
| RU | 960701 | 4/1981 |
| RU | 998995 | 2/1983 |
| RU | 2069878 | 11/1996 |

(Continued)

OTHER PUBLICATIONS

Seydoux et al., "Deep Resistivity Logging while Drilling Device for Proactive Geosteering," The Leading Edge, v. 23, No. 6, pp. 581-586 (2004).

(Continued)

*Primary Examiner* — Janet Suglo
(74) *Attorney, Agent, or Firm* — Darla Fonseca

(57) ABSTRACT

Method and system for visualizing one or more properties of a subterranean earth formation while drilling a borehole using probability information from a modeling process. Probability waveforms based on information from a plurality of borehole stations may be plotted, either alone or superimposed onto other graphical representations, to provide a visual display that is easily interpreted by a user to make geosteering decisions. The probability waveforms include peaked sections that are proportional to the amount of uncertainty or error associated with a boundary estimate at a particular distance from an axis of the borehole. By providing a visual display of the uncertainty, a user can make better geosteering decisions.

36 Claims, 13 Drawing Sheets

FOREIGN PATENT DOCUMENTS

RU 2107313 3/1998

OTHER PUBLICATIONS

Yang et al., "Bed Boundary Effect Removal to Aid Formation Resistivity Interpretation from LWD Propagation Measurements at all Dip Angles," SPWLA 46th SPWLA Annual Symposium, Jun. 26-29, 2005.

Oldenburg et al., "Estimating Depth of Investigation in DC Resistivity and IP Surveys," Geophysics Soc. of Expl. Geophys., vol. 64, pp. 403-416 (1999).

VF Machetin, et al., "TEMP—a New Dual-Electromagnetic and Laterolog Apparatus-Technological Complex," 13th European Formation Evaluation Symposium Transactions, Budapest Chapter, SPWLA, Paper K (1990).

VA Korolev et al., "Electromagnetic Logging by a Lateral Magnetic Dipole. Perspectives of Electromagnetic Well Scanning," Geofizika Scientific-Production Company, Russia (1995).

"Double Electromagnetic and Lateral Logging," Methodical Handbook, Moscow, Nedra, Russian (1991).

International Preliminary Report on Patentability of PCT Application Serial No. PCT/US2009/032207 dated Aug. 19, 2010.

* cited by examiner

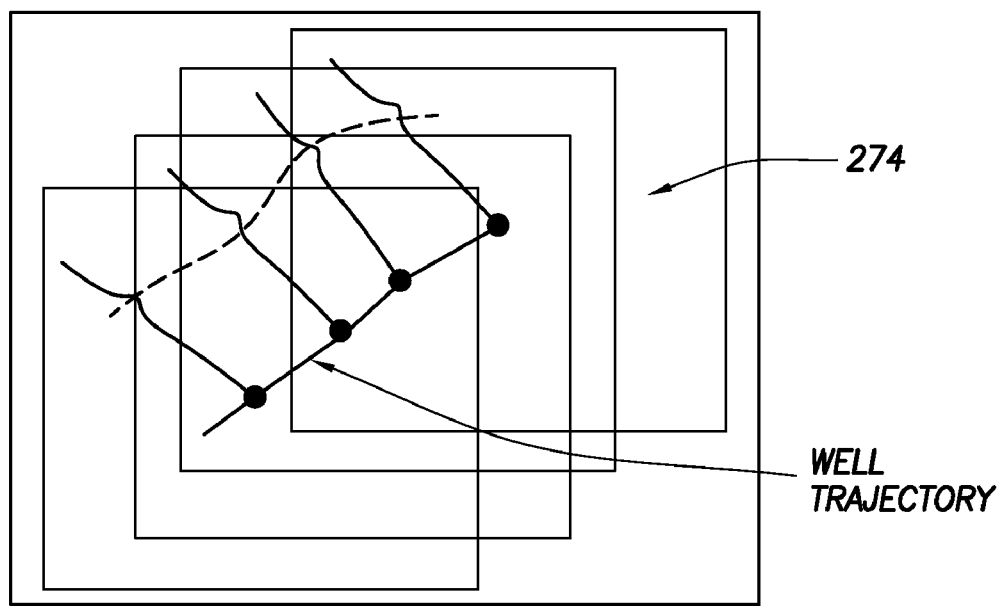
FIG.9
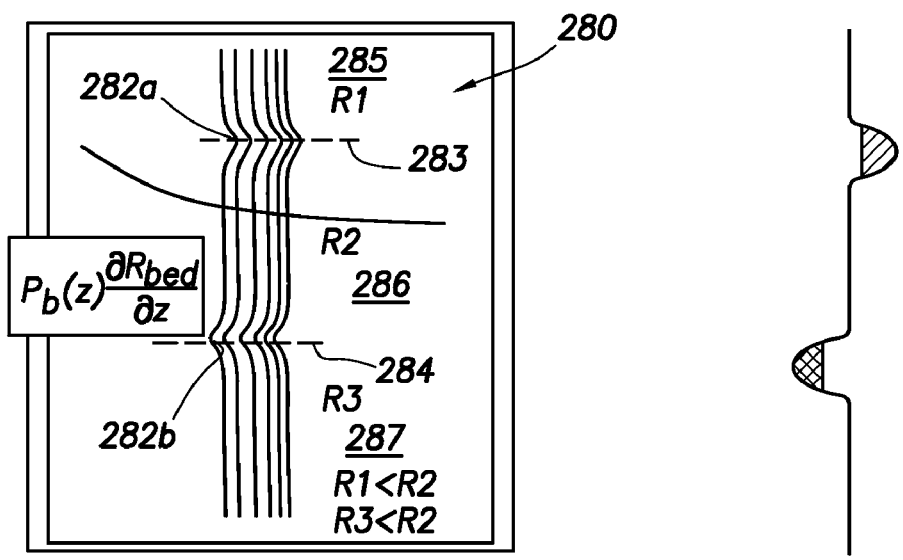
FIG.10A
FIG.10B

SYSTEM AND METHOD FOR DISPLAYING DATA ASSOCIATED WITH SUBSURFACE RESERVOIRS

BACKGROUND

1. Technical Field

The present disclosure relates generally to the field of measurement-while-drilling tools. More particularly, this disclosure relates to methods for processing signals from a measurement-while-drilling tool to model and visualize layered subterranean earth formations surrounding the tool.

2. Description of the Related Art

Wellbores drilled through earth formations to extract fluids such as petroleum are frequently drilled along a substantially horizontal trajectory in a reservoir in order to increase the drainage area in the reservoir. Because such reservoirs are frequently located in layered subterranean earth formations, the position of the substantially horizontal wellbore relative to the boundaries of the layers in the earth formation often has a material effect on the productivity of such wellbores.

Geosteering solutions have been developed that utilize a measurement-while-drilling tool to provide for real-time prediction and visualization of the layer structure of the subterranean earth formation surrounding the tool. Such real-time visualization allows operators to control the direction of the wellbore drilling operations in order to place (i.e., land) the wellbore in a particular section of a reservoir to minimize gas or water breakthrough and maximize economic production therefrom.

Electromagnetic (EM) induction and propagation-style logging tools are well suited for these geosteering applications because of their relatively large lateral depth of investigation into the surrounding formation. Directional EM measurement-while-drilling tools have recently been proposed; see Seydoux et al., "A Deep-Resistivity Logging-While-Drilling Device for Proactive Geosteering," The Leading Edge, Vol. 23, no. 6, pp 581-586, 2004; Li et al., "New Directional Electromagnetic Tool For Proactive Geosteering And Accurate Formation Evaluation While Drilling," 46th SPWLA Annual Symposium, Jun. 26-29, 2005; and Yang et al., "Bed-Boundary Effect Removal to Aid Formation Resistivity Interpretation from LWD Propagation Measurements at All Dip Angles", SPWLA 46th Annual Logging Symposium, New Orleans, Jun. 26-29, 2005, all incorporated by reference herein in their entireties. Such directional EM measurement-while-drilling tools enable distinguishing the resistive properties of the formation above and below the tool location while drilling substantially horizontal and deviated wells. These measurement-while-drilling tools routinely carry both relatively short coil spacings sensitive to the EM properties of the formation layers near the logging tool location as well as longer coil spacings that are also sensitive to the resistive properties of formation layers farther away from the tool location. When drilling through some earth formations, the directional EM measurement-while-drilling tools are sensitive to formation properties quite distant from the instrument location, while in other formations, the tools are only sensitive to more local formation properties near the instrument.

More recent geosteering solutions provide for modeling and visualization of the formation properties near the tool locations (see commonly owned, U.S. Pat. No. 6,594,584, entitled "Method for Calculating a Distance Between a Well Logging Instrument and a Formation Boundary by Inversion Processing Measurements from the Logging Instrument", incorporated herein by reference in its entirety). These geosteering solutions, however, do not effectively model and visualize formation properties far away from the tool locations. Thus, in some earth formations, the formation properties and boundary locations far away from the tool location are only partially determined from the measurements, and it is difficult to locate (e.g., land) the wellbore in a desired section of the reservoir that maximizes economic production without quantifying and effectively displaying this partial information.

Some methods for displaying bed boundary locations through the use of color saturation have been published previously by Oldenburg, et al., "Estimating depth of investigation in DC resistivity and IP Surveys," Geophysics Soc. of Expl. Geophys., Vol. 64, pp 403-416, 1999, incorporated by reference herein in its entirety. These methods (a) do not use uncertainty but a "depth of investigation" (DOI) index to indicate where resistivity is unconstrained by the data and (b) are applied to surface resistivity measurements.

A modeling system and method that uses color saturation to indicate uncertainty is disclosed in commonly owned U.S. Patent Application Publication No. 2007/0168133, entitled "Computer-based method for while-drilling modeling and visualization of layered subterranean earth formations." That method gathers electromagnetic signals corresponding to a current measurement station location of a measurement-while-drilling tool, and generates a multilayer model corresponding to such electromagnetic signals. A histogram characterizing uncertainty of the multilayer model is used to generate a set of color hue values which represent predictions of the formation property for depth values above/below the tool, and a corresponding set of saturation values (which represent uncertainties for these predictions). A curtain plot is generated and displayed. The curtain plot employs colors to visualize formation property predictions for depth values above/below the tool over successive measurement station locations. A new column of the curtain plot is generated for the current measurement station location. The color values of the new column are based upon the set of color hue values and the set of saturation values derived from the histogram, and the saturation levels of the new column represent uncertainties for the corresponding predictions.

FIG. 15 illustrates a wellsite system in which the present invention can be employed. The wellsite can be onshore or offshore. In this exemplary system, a borehole 611 is formed in subsurface formations by rotary drilling in a manner that is well known. Embodiments of the invention can also use directional drilling, as will be described hereinafter.

A drill string 612 is suspended within the borehole 611 and has a bottom hole assembly 700 which includes a drill bit 705 at its lower end. The surface system includes platform and derrick assembly 610 positioned over the borehole 611, the assembly 610 including a rotary table 616, kelly 617, hook 618 and rotary swivel 619. The drill string 612 is rotated by the rotary table 616, energized by means not shown, which engages the kelly 617 at the upper end of the drill string. The drill string 612 is suspended from hook 618, attached to a traveling block (also not shown), through the kelly 617 and a rotary swivel 619 which permits rotation of the drill string relative to the hook 618. As is well known, a top drive system could alternatively be used.

In the example of this embodiment, the surface system further includes drilling fluid or mud 626 stored in a pit 627 formed at the well site. A pump 629 delivers the drilling fluid 626 to the interior of the drill string 612 via a port in the swivel 619, causing the drilling fluid to flow downwardly through the drill string 612 as indicated by the directional arrow 8. The drilling fluid exits the drill string 612 via ports in the drill bit 705, and then circulates upwardly through the annulus region between the outside of the drill string and the wall of the borehole, as indicated by the directional arrows 9. In this well known manner, the drilling fluid lubricates the drill bit 705 and carries formation cuttings up to the surface as it is returned to the pit 627 for recirculation.

The bottom hole assembly 700 of the illustrated embodiment comprises a logging-while-drilling (LWD) module 720, a measuring-while-drilling (MWD) module 730, a roto-steerable system and motor, and drill bit 705.

The LWD module 720 is housed in a special type of drill collar, as is known in the art, and can contain one or a plurality of known types of logging tools. It will also be understood that more than one LWD and/or MWD module can be employed, e.g. as represented at 720A. (References, throughout, to a module at the position of 720 can alternatively mean a module at the position of 720A as well.) The LWD module includes capabilities for measuring, processing, and storing information, as well as for communicating with the surface equipment. In the present embodiment, the LWD module includes a directional resistivity measuring device.

The MWD module 730 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

FIG. 16 depicts a directional deep-reading logging-while-drilling drilling tool, as part of the LWD tool or tools 720 in FIG. 15. Signals from tools having axially aligned cylindrically symmetrical coils are not directionally sensitive. The tool of FIG. 16 provides tilted and transverse coils to obtain directionally sensitive measurements. The sensor array includes six transmitter antennas and four receiver antennas. Five transmitter antennas ($T_1$ through $T_5$) are arranged axially along the length of the tool. A sixth transmitter antennas ($T_6$) is oriented transverse to the tool axis. A receiver antenna is positioned at each end of the tool. This pair of receiver antennas ($R_3$ and $R_4$) brackets the transmitters, and each of these receivers is tilted 45 degrees to the tool axis. An additional pair of receiver antennas ($R_1$ and $R_2$), located in the center of the transmitter array, is arranged axially and can obtain conventional type propagation resistivity measurements. The described arrangement produces a preferential sensitivity to conductivity on one side of the tool. As the tool rotates, its sensors can detect nearby conductive zones and register the direction from which maximum conductivity can be measured. Magnetometers and accelerometers can provide reference directional orientation data for the tool. In addition to its directional capability, the tool provides relatively deeper measurements than most conventional LWD resistivity tools. The substantially real time bidirectional drill string telemetry hereof, in conjunction with the capabilities of the directional resistivity logging tool, as described, improves performance of geosteering by increasing the amount of data at the surface and the speed and precision of directional drilling control.

SUMMARY

A method to produce a map of a subsurface earth formation penetrated by a wellbore comprising measuring a physical characteristic of the formation at two or more stations within the wellbore; deriving, for at least two wellbore stations, probability functions; and producing the map using the probability functions.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 1B-1 is a flow chart illustrating a prior art method of modeling and visualizing properties of a subterranean earth formation.

FIG. 1B-2 illustrates exemplary windows generated by the while-drilling modeling and visualization workflow of FIG. 1B-1.

FIG. 2 is a schematic illustration of a model used in the prior art method, including layer thickness parameters, horizontal resistivity layer properties, and the relative formation dip parameter $\alpha$.

FIG. 9 is an exemplary display in which the vertical and horizontal projections are used to provide a visual display that facilitates a three-dimensional view of the formation.

FIG. 10A is an exemplary display in which the probability waveforms are modified to indicate resistivity contrasts between adjacent layers.

FIG. 10B is an exemplary display in which the probability waveform is shaded to indicate resistivity contrast between adjacent layers.

It should be understood that the drawings are not necessarily to scale and that the disclosed embodiments are sometimes illustrated diagrammatically and in partial views. In certain instances, details which are not necessary for an understanding of the disclosed method and apparatus or which render other details difficult to perceive may have been omitted. It should be understood that this disclosure is not limited to the particular embodiments illustrated herein.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Systems and methods are disclosed herein for displaying one or several attributes derived from a mathematical process used in a modeling estimation that can, in combination with other real time display data, contribute to a clearer picture of formation/reservoir structure and location of fluid contacts. These systems and methods may provide real time visual information or maps about the position of the drilling assembly with respect to reservoir markers (such as reservoir top and bottom, oil/water contact, gas/water contact, or gas/oil contact) that is easy to interpret and use in making wellbore steering decisions. More specifically, systems and methods are disclosed for visualizing the uncertainty associated with the position or orientation of the boundary detected by the tool. The maps may be multi-dimensional such as 2-dimensional or 3-dimensional. A formation may be a collection of one or more layers of the earth's subsurface characterized by bed boundaries, bed thicknesses, dip, azimuth, etc.

As used herein, the term "physical characteristic" means the output of a measurement device that is related to a formation and/or reservoir property. The formation property may include, but is not limited to, resistivity, permeability, porosity, fluid saturation, produceability, and acoustic response.

As used herein, the terms "marker" and "boundary" are used interchangeably to refer to a physical attribute of a formation and/or reservoir formed therein. Markers or boundaries may include a reservoir top surface, a reservoir bottom surface, an interface between oil and water layers, an interface between gas and water layers, and an interface between gas and oil layers.

Figure 1A:
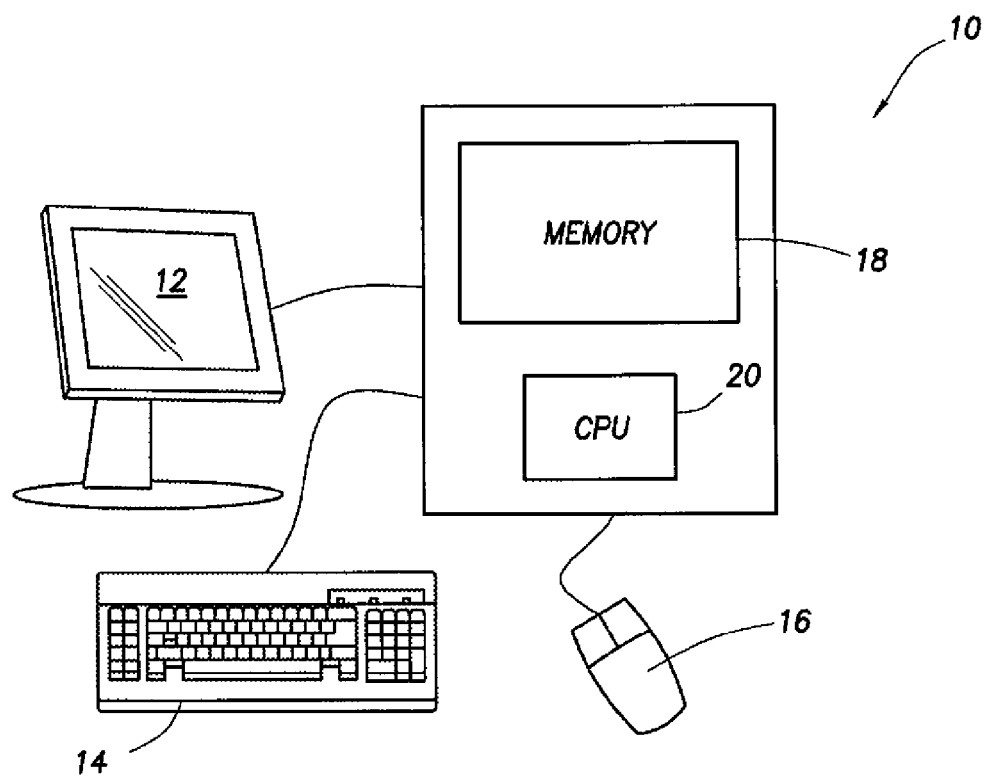
FIG. 1A is a block diagram of a computer processing system on which the disclosed systems and methods may be performed.

FIG. 1A is a functional block diagram of a general purpose computer system 10 that embodies the subject matter of the present disclosure. The computer system 10 may include a work station (or high performance personal computer) that performs the relevant computations and visualizations as discussed below. For example, the computer system 10 may include a display device 12 and user input devices such as a keyboard 14 and mouse 16. The computer system 10 also includes memory 18 (e.g., persistent memory such as a magnetic hard disk drive as well as non-persistent memory such as one or more DRAM modules) that stores software application(s) that are executed on a processor 20 to perform the relevant computations and visualizations as discussed below. The memory 18 and processor 20 may be realized by a uniprocessor-type computer system, a multiprocessor-type computer system, or a cluster of computer processing systems as are well known in the computer art. The software applications stored in the memory 18 include a programmed sequence of instructions and data, which are typically stored on one or more optical disks and loaded into the memory 18 by an optical disk drive (not shown) for persistent storage therein. Alternatively, such software applications can be loaded into the memory 18 over a network connection (e.g., an Internet connection) or other suitable means for persistent storage therein.

Figure 1B:
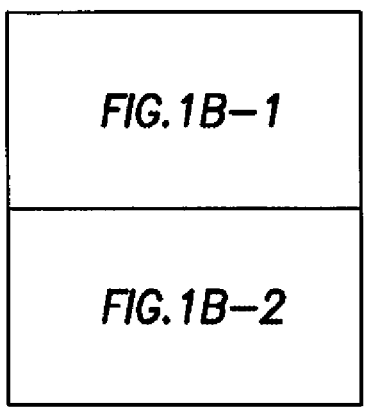
FIG. 1B is a flow chart illustrating a prior art method of modeling and visualizing properties of a subterranean earth formation.
Figures 1, 1B:
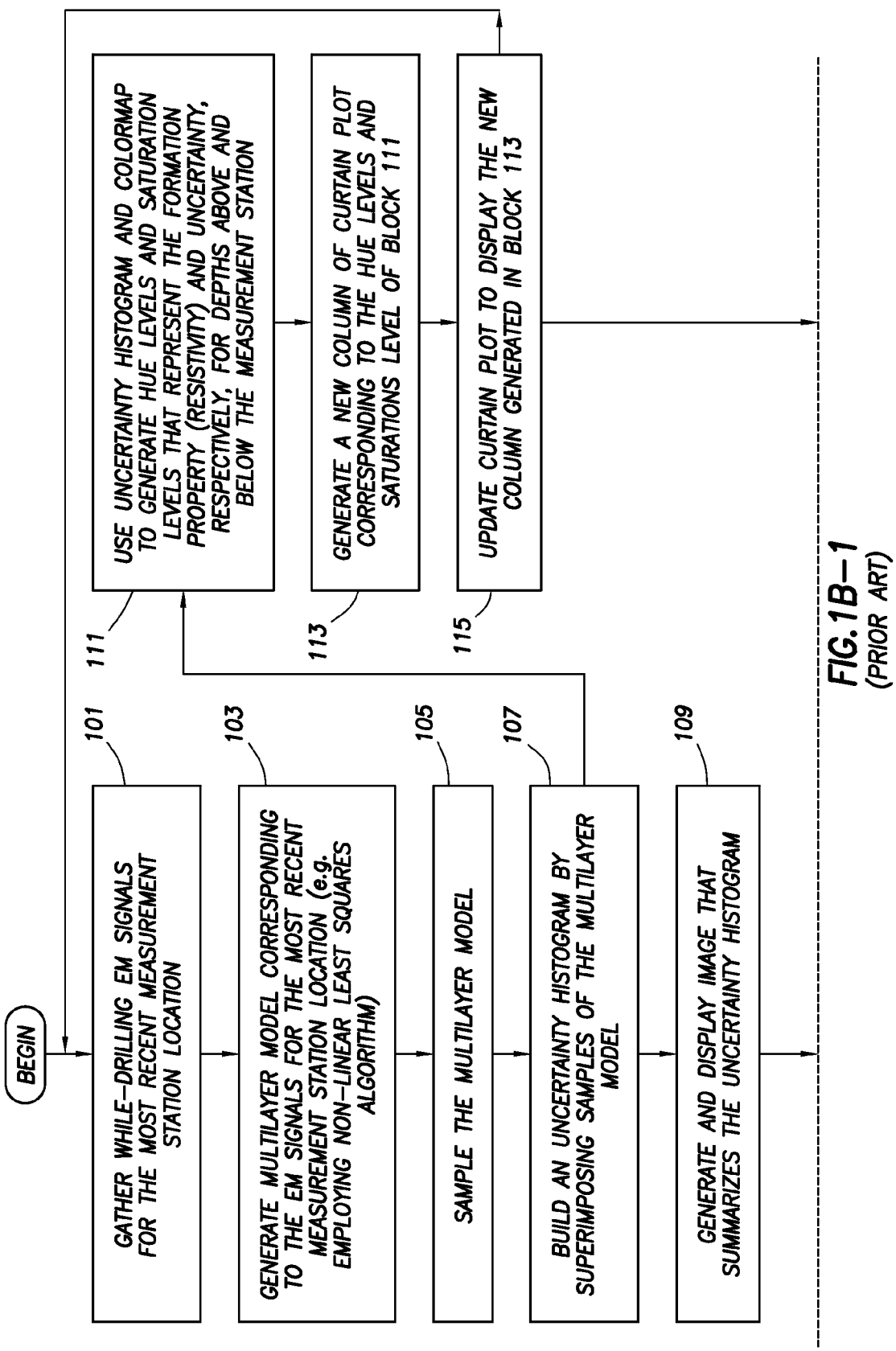

Prior to describing the subject matter of the claims, the method for displaying uncertainty information disclosed in U.S. Patent Application Publication No. 2007/0168133 will be summarized herein. More specifically, FIG. 1B illustrates a workflow that embodies a computer-based methodology that utilizes electromagnetic (EM) signals from a measurement-while-drilling tool to generate real-time predictions and visualizations of at least one subterranean earth formation property (e.g. resistivity) with quantified uncertainties. The real-time predictions and visualizations provide information regarding the formation properties near the tool locations as well as information regarding the formation properties far away from the tool locations. Such real-time information and visualizations are advantageous in geosteering applications because they allow for location of the wellbore in desired sections of the reservoir that maximize economic production therefrom.

The methodology begins in step 101 by gathering the electromagnetic (EM) signals obtained from a measurement-while-drilling tool at its most recent measurement station. In block 103, a multilayer model is generated that is in agreement with the electromagnetic (EM) signals for the most recent measurement station. In block 105, the model is sampled to obtain a collection of layered models that are approximately consistent with the electromagnetic (EM) signals for the most recent measurement station. In the preferred embodiment, the multilayer model is derived and sampled from a non-linear least squares algorithm as described below. In block 107, the model samples are superimposed upon one another to build a histogram that characterizes the uncertainty in at least one predicted formation property (e.g., resistivity) at locations above and below the measurement station. In block 109, an image that summarizes the histogram is generated and displayed as part of a display window (e.g., the left pane of the display window of FIG. 3A or 3B). In block 111, a colormap is employed to convert the formation property and uncertainty information represented by the histogram to hue levels and saturation levels that represent at least one predicted formation property and corresponding uncertainty for locations above and below the measurement station. In block 113, the hue levels and saturation levels generated in block 111 are used to generate a new column of a curtain plot. In block 115, the new column of the curtain plot is displayed as part of a display window (e.g., a new right pane of the display window of FIG. 3A or 3B). The operations then return back to block 101 to continue the operations for the while-drilling measurements for the next measurement station.

Figures 1, 1B, 2:
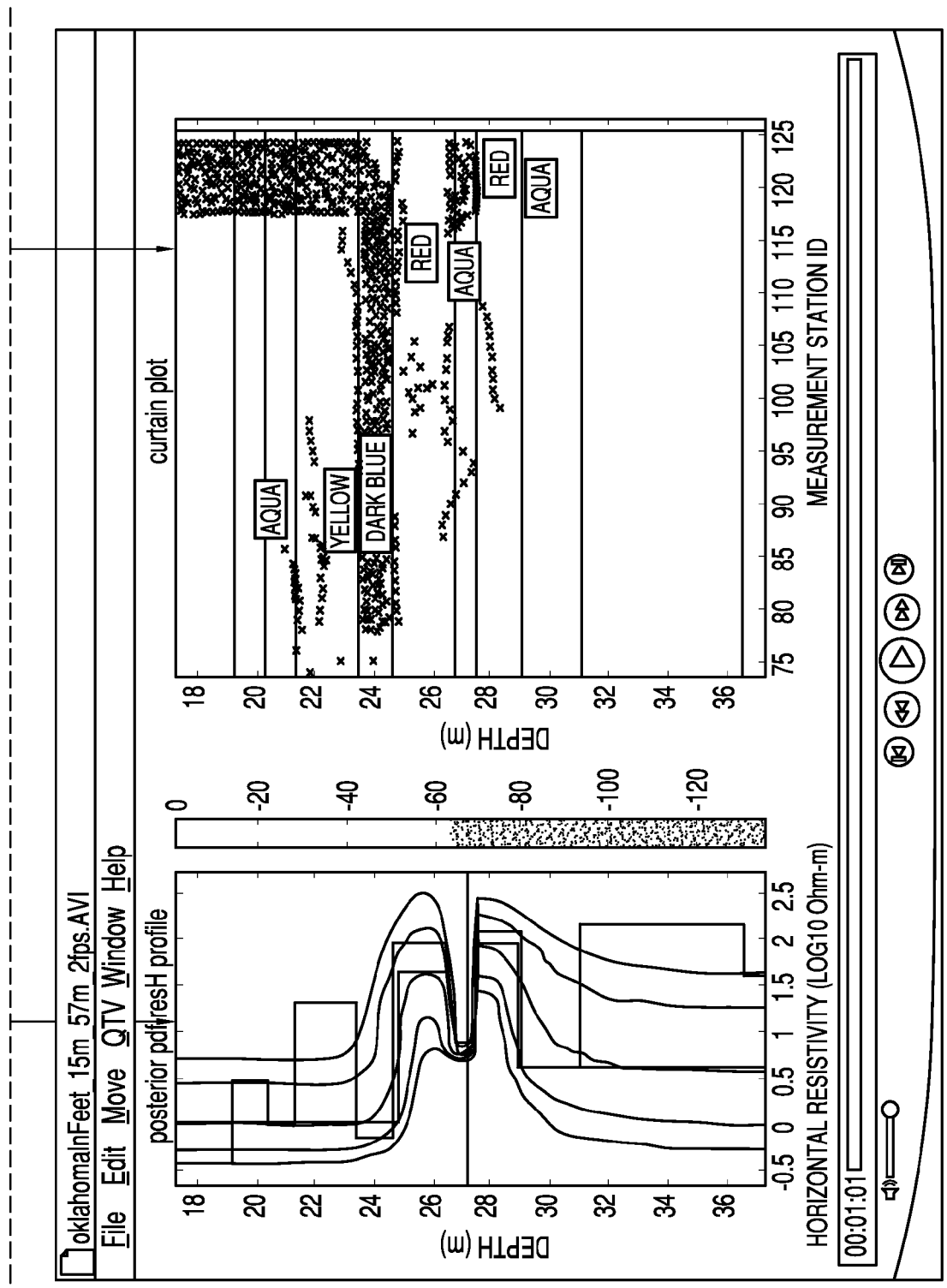

The method employs a probability density function (PDF) that describes a multilayered model of formation properties at each measurement station or segment of measurement stations along the trajectory of the wellbore. This multilayered model is illustrated in FIG. 2. The parameters of the multi-layered model m comprise: (1) horizontal and vertical resistivity ($\rho_h$, $\rho_v$) of the layers; (2) vertical thicknesses ($\tau$) of the layer boundaries and thicknesses above and below the wellbore within a layer; and (3) the relative dip ($\alpha$) of the formation with respect to the axis of the measurement device. The number of layers in the model can be fixed by the user or the software can optimize the number of layers for the model at each measurement station as described below in more detail. Non-parallel boundaries could also be estimated by the inversion, in which case, each boundary will be characterized by additional parameters (e.g., its own inclination and dip-azimuth).

The parameters of the multilayered model are determined on the basis of electromagnetic measurements acquired at the current measurement station (or possibly from a most recent segment of measurement stations). The electromagnetic measurements consist of the amplitudes and phases of electromagnetic measurement signals recorded using a set of receivers and transmitters with various operating frequencies and coil spacings. These measurements are denoted $d^{Obs}$. In the preferred embodiment, the measurements $d^{Obs}$ are obtained in real-time from a directional propagation-style measurement-while-drilling tool which is capable of distinguishing the formation properties above and below the tool location as described above.

The goal of an inversion is to estimate some unknown parameters from a set a measurements that are sensitive to those parameters. For this estimation process to be valid, one must be able to reproduce the measurements if all parameters are known. This prediction capability is known as a forward model (i.e., some function mapping parameters to measurements such as $d^{Obs}=g(m)$). It is also preferable to have a noise model for those measurements to represent the measurement errors. Given the parameters m, one can compute the probability of $d^{Obs}$ given that m has occurred ($f(d^{Obs}|m)$). Other required information is the a priori information on the parameters $f(m)$, the probability of m before we perform any measurements.

We can then apply Bayes theorem:

$$f(m|d^{Obs}) = \frac{f(d^{Obs}|m) \cdot f(m)}{f(d^{Obs})}.$$

The denominator may be considered a normalizing constant.

The right hand-side of this expression is the probability of m given that d is observed, and may be compared to the a priori probability. Having the posterior probability, we can get the most likely set of parameters that maximize this probability $Pr(m|d^{Obs})$, or get the expected value defined classically by:

$$E(m) = \int Pr(m|d^{Obs}).dm$$

Estimation of the spread of the possible parameter values could be obtained by estimating the standard deviation of the probability distribution. Stochastic algorithms are well adapted to generate samples of such probability distributions that are defined up to a multiplicative constant. They are discrete approximations of the general probability distributions.

The fundamental PDF of interest is the a posteriori PDF of the uncertain model parameters conditional on the measurements $d^{Obs}$. This PDF can be written using Bayes' rule $$f(m|d^{Obs}) \alpha f(m) f(d^{Obs}|m)$$

where the prior PDF $f(m)$ is defined on the basis of what is known about m independent of the measurement data $d^{Obs}$ and typically describes physically reasonable bounds for the model parameters.

The likelihood function $f(d^{Obs}|m)$ measures how probable are the observed data values for a given value of the parameters of the multilayered model m. Many methods for computing this posterior distribution are well known in the prior art. One method uses the nonlinear least squares algorithm as described in the '133 application to obtain a posterior mean $\hat{m}$ and covariance matrix $\hat{C}$ that can be used to define a normal distribution N($\hat{m}$, $\hat{C}$) that approximates the posterior distribution $f(m|d^{Obs})$. Additional methods can be utilized when the nonlinear least squares algorithm fails to converge. Such additional methods include a Markov Chain Monte Carlo sampling method as described below.

By sampling from this normal distribution N($\hat{m}$, $\hat{C}$) (block 105), one can obtain a collection of layered models that are approximately consistent with the measurements $d^{Obs}$. By superimposing a large number of these samples (block 107), an uncertainty profile of the predicted formation resistivity above and below the measurement station is generated. In general, near the measurement station in vertical depth, many of the resistivity profiles will be relatively similar, and there will be small uncertainty in the uncertainty profile image. Farther away from the measurement station in vertical depth, the measurements typically provide only vague constraints, and there is large variation in the layered resistivity models. In these far away regions, the uncertainty in the resistivity profiles will be large. This variability of the uncertainty in the resistivity profiles depends on the true resistivities of the formation as well as the spacings, frequencies, and other characteristics of the measurement device. According to the previous method, the uncertainty profile may be a set of contour curves (e.g., 5%, 25%, 50%, 75%, 95% contours) of a histogram of horizontal resistivity predictions that are sampled from the multilayer model. Images of such uncertainty profiles for two exemplary data sets are displayed in the left panels of the display windows of FIGS. 3A and 3B, respectively.

Figure 3A:
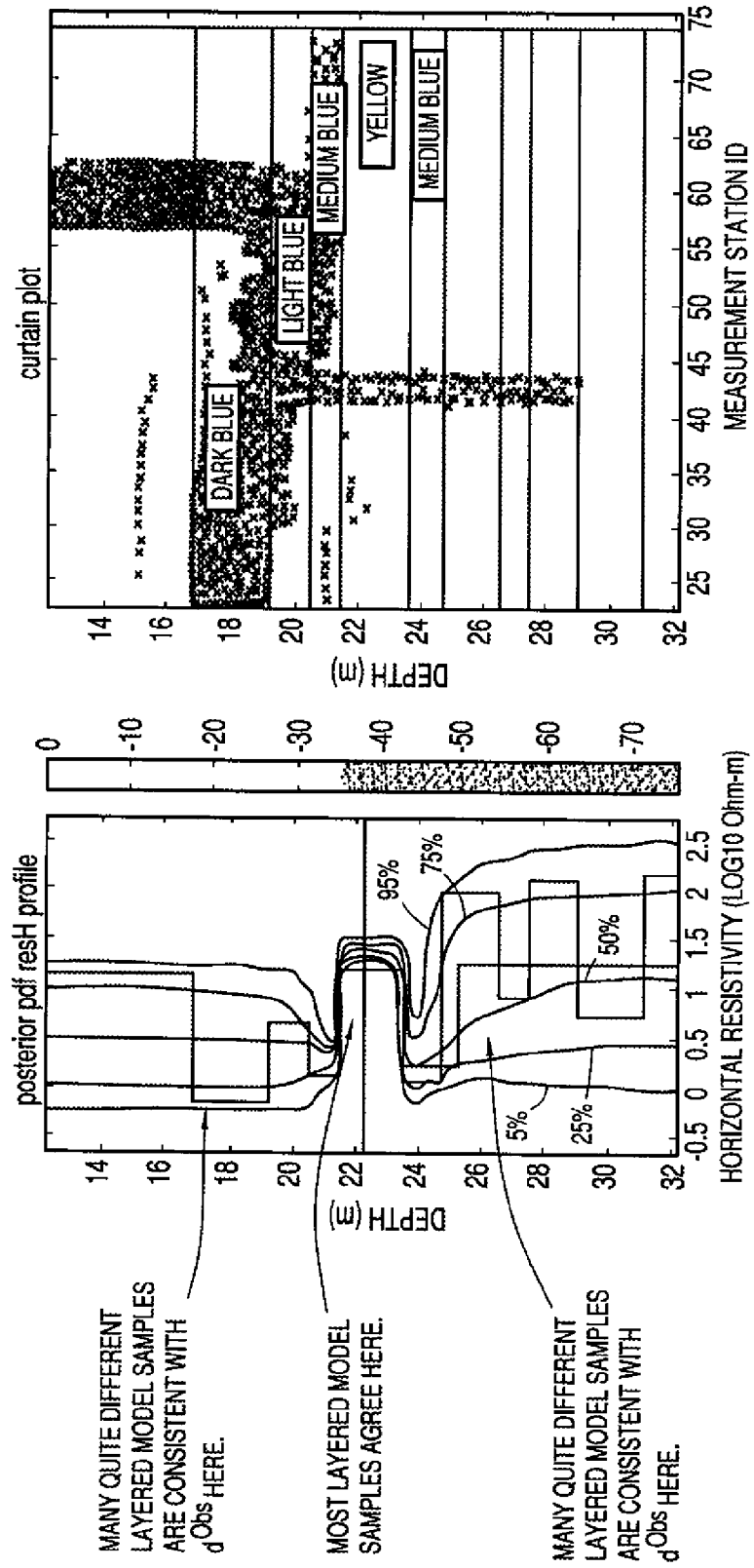
FIGS. 3A and 3B illustrate exemplary windows generated by the while-drilling modeling and visualization workflow of FIG. 1B.

Note that left panel of the display window of FIG. 3A shows an uncertainty profile image where most of the layered models have relatively similar profiles near the depth of the measurement station (indicated by the horizontal line). However, there is a relatively large variation in the description of the shoulder beds at depths far away from the measurement station. The measurements primarily constrain the thickness and resistivities of the layer containing the measurement device and the resistivities of the layers above and below the measurement device, while only vague information is available about the shoulder bed thicknesses. This large variation in the formation resistivity farther away from the measurement device is essentially the uncertainty in the prior distribution, so that this posterior uncertainty profile image shows where the measurements constrain the formation resistivity relative to the prior distribution.

Figure 3B:
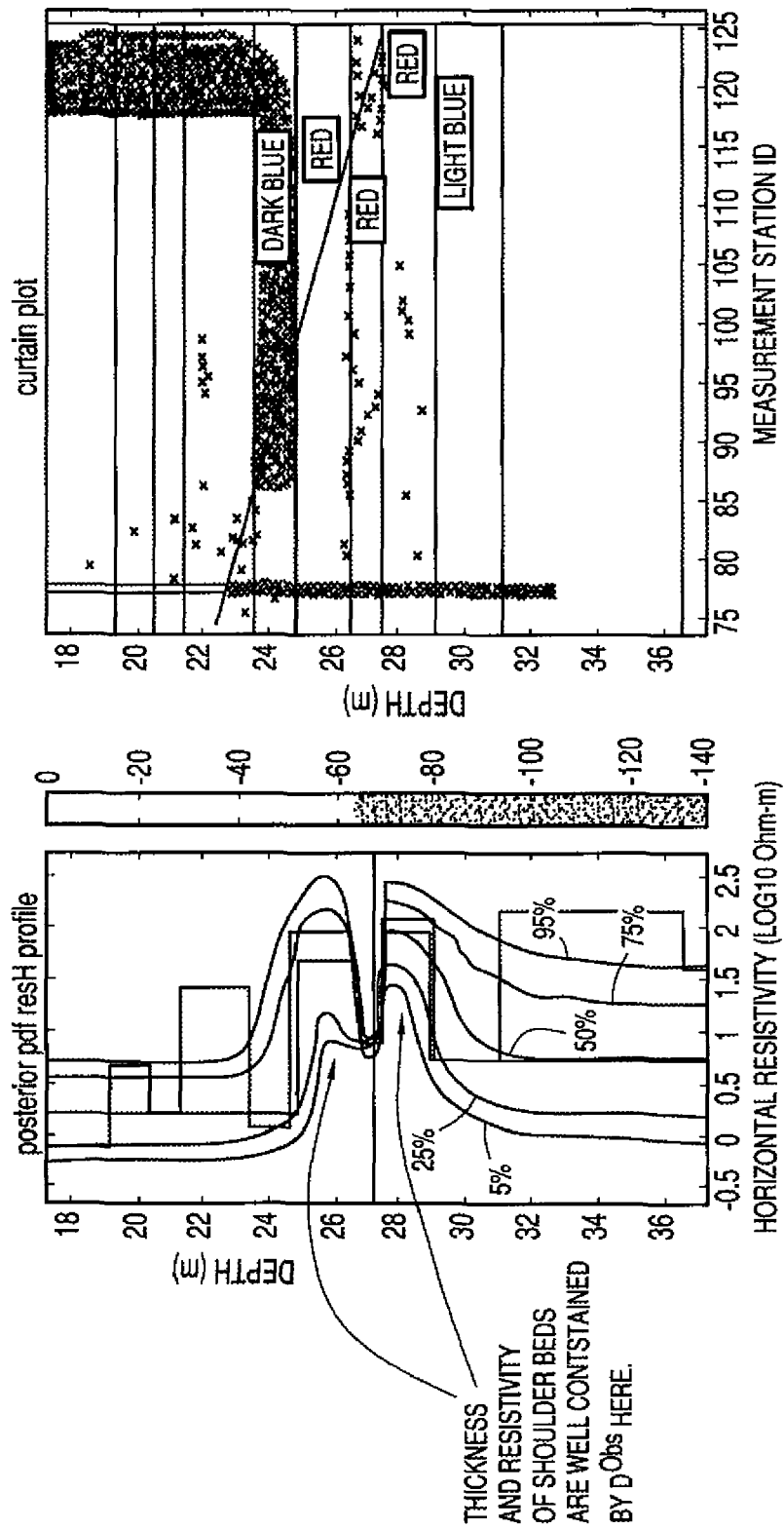

In contrast, the left panel of the display window of FIG. 3B shows an uncertainty profile where many of the layered models have shoulder beds whose thickness and resistivities are well constrained by the measurements. In other words, there is a relatively small variation in the description of the shoulder beds at depths far away from the measurement station.

The uncertainty profile for the predicted formation resistivity above and below the measurement station can be summarized and such summary information included as the last column of a specially constructed curtain plot (blocks 111-115). The curtain plot summarizes both the predicted formation resistivity and the uncertainty corresponding thereto for all available measurement stations. In the illustrated example, the new column for the curtain plot is constructed by first extracting the 50% contour curve and a width curve from the uncertainty profile. The width curve is defined as half the difference between the 95 and 5 percentile curves of the uncertainty profile. The extracted 50% contour curve and the width curve are digitized into two vectors whose elements correspond to vertical depth values. According to the prior art method, a colormap is used to convert the elements of the two vectors into a set of corresponding hue levels and saturation levels (block 111). The color values for a new column of the curtain plot is generated using these hue levels and saturation levels (block 113), and the new column is added to the curtain plot display (block 115). Note that the hue of the curtain plot display conveys localized resistivity information while the saturation level of the curtain plot display conveys uncertainty of the corresponding localized resistivity information. In this manner, the saturation levels of the colors in the curtain plot provide information as the uncertainty of the formation resistivity predictions whereby formation resistivity predictions with higher certainty have higher saturation levels as compared to those for formation resistivity predictions with lower certainty.

When Gauss-Newton inversion is used, the probability $Pr(m|d^{Obs})$ is a function of the parameters only if we fix the measurements we want to invert. Searching for the most likely set of parameters is equivalent to searching for the maximum of that function, or more practically, the minimum of its likelihood. This can be defined by:

$$L(m|d) = -\log(f(m|d^{Obs}))$$

Assuming the forward model is locally linear ($d^{Obs}=g(m) \approx \alpha + \beta^T.m$), the measurement noise can be modeled by a zero mean Gaussian distribution, and all values are equally probable a priori on the parameters, then the posterior probability function becomes a product of Gaussian distributions, and closed forms can be generated to express the maximum likelihood parameter set and the corresponding covariance matrix.

The family of such iterative algorithms should converge to the most likely parameter set m. Gauss-Newton, Levenberg-Marquardt, and SQP are popular variations of this approach. Numerical techniques can be applied to estimate the shape of the probability distribution around those most likely parameter values.

Figure 4:
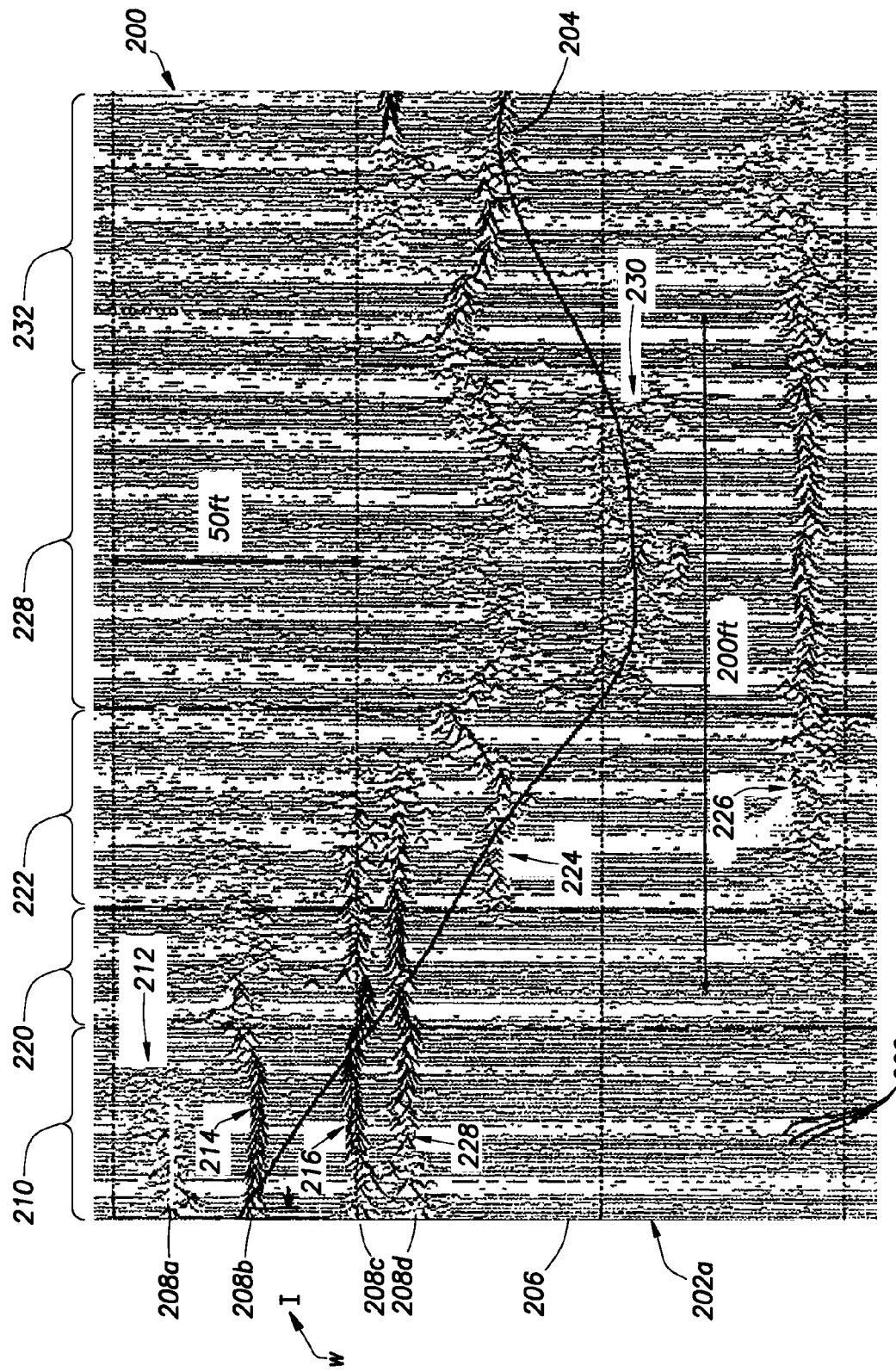
FIG. 4 is an exemplary display showing a plurality of plotted probability waveforms relative to a borehole path.

The prior art modeling method described above yields information that not only estimates formation/reservoir boundaries but also outputs uncertainty information. Uncertainty in the estimations arises primarily from the inherent uncertainty associated with obtaining the measurement data, as well as the necessary simplification in the model used to approximate the location of boundaries or markers in the formation. Consequently, the estimates produced by the method can be viewed as random variables that are subject to the laws of statistics. The mathematical process used to obtain the model may therefore provide both an estimate of the actual formation structure as well as a probability function indicating the likelihood that a structure can be detected at the given distance from the wellbore. According to the present disclosure, the probability information may be visually displayed in a manner that permits a user to more accurately interpret the measured data, thereby improving well steering decisions. The probability functions are related to a formation property or a function of the formation property FIG. 4 illustrates a first embodiment of a visual display 200 plotting waveforms 202 derived from a probability function $p_b(Z)$ that uses the probability information generated by a known modeling method, such as the modeling method described above. Each waveform 202 represents a distribution of probabilities with respect to distance that was obtained at a particular wellbore station. The probability functions are plotted in juxtaposition to one another. The visual display 200 also includes a graphical representation of a wellbore 204 traveling through the formation that may be used, for example, to make geosteering operation decisions. The wellbore 204 is oriented substantially horizontally, and therefore the distance from the wellbore station corresponds to a depth below the surface, and may be provided as true vertical depth (TVD) to facilitate comparison and use with other formation/reservoir information. It will be appreciated, however, that the system and method may be used with substantially vertical wellbores, in which case the distance from the wellbore station represents a horizontal distance.

The probability waveforms 202 are plotted such that depth is along the vertical axis and the magnitude of the probability function is along the horizontal axis. Accordingly, a given probability function waveform 202a may include relatively linear sections 206, which indicate no boundary or marker of interest is detected, and peaked sections 208a-d, which indicate locations of potential markers of interest. A width "W" of each peaked section 208a-d (see also FIG. 5) indicates the magnitude of uncertainty or error that the marker is, in fact, located at a particular depth. Thus, peaked sections having larger widths indicate depth estimates that are less certain than those sections having smaller widths.

By plotting a plurality of probability waveforms 202 at multiple stations along the wellbore path 204, as shown in FIG. 4, a user may identify several potential boundary layers as the wellbore traverses the formation. Starting at the left-hand side of the display 200, a first zone 210 shows the wellbore as it traverses the formation in an area that appears to have two boundaries 212, 214 above the wellbore and two boundaries 216, 218 below the wellbore. The boundaries may represent different formation layers, surfaces of a reservoir, interfaces between liquids and/or gases, or other boundaries of potential interest. Based on this or other data, the user may elect to advance the drill to a deeper TVD. As the wellbore advances to the right, it reaches a second zone 220 in which it detects boundaries 216, 218 (which are now located above the wellbore) but no lower boundary. Further advancement of the wellbore reaches a third zone 222, where another boundary 224 is detected near the wellbore and a potential lower boundary 226 is detected far below the wellbore. As the wellbore reaches fourth zone 228, another boundary 230 is detected near the wellbore. At this point, based on current or additional data, the user may determine that the wellbore has landed in the layer of interest, and therefore raises the drilling tool to a new TVD. In a fifth zone 232, the boundary 230 is no longer visible but the wellbore is positioned closer to the boundary 224, which has been determined by the operator as the upper surface of a reservoir. By positioning the wellbore in this manner, the user will maximize production from the reservoir.

Figure 5:
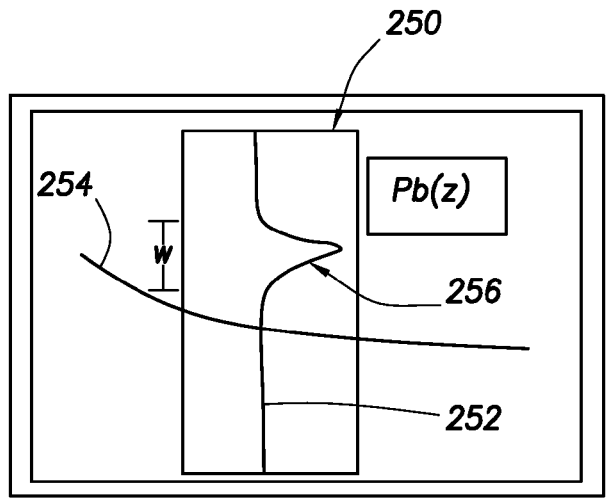
FIG. 5 is an exemplary display showing a plot of a probability function at a single borehole station, resulting in a single probability waveform shown relative to the borehole path.
Figure 14A:
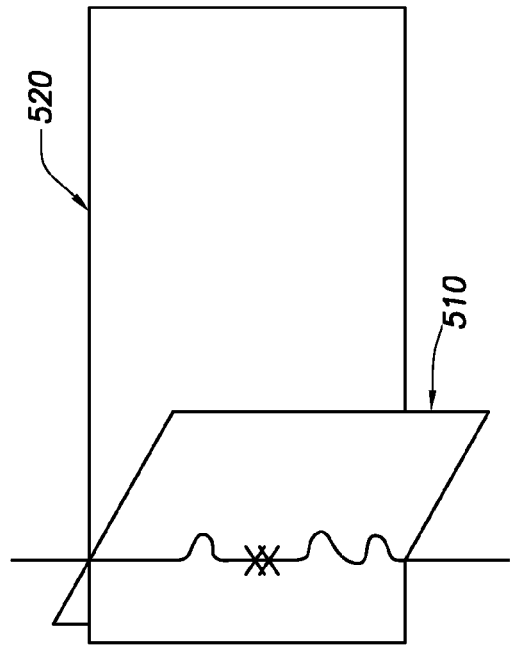
FIGS. 14a-c show the synthesis of a psuedo 3D "seismic" cube.

FIG. 5 illustrates a two-dimensional plot 250 of a single probability function waveform 252 at a particular wellbore station. Similar to the composite chart shown in FIG. 4, the plot 250 shows a wellbore path 254 using TVD along the vertical axis and horizontal position along the horizontal axis. Superimposed on the wellbore path 254 is the probability waveform 252 using TVD along the vertical axis and magnitude of probability along the horizontal axis. The waveform 252 is further positioned on the plot 250 so that it intersects the wellbore path 254 at the wellbore depth at which the physical measurements were taken for the modeling process. The waveform 252 includes a peaked section 256 indicating a potential boundary of interest. The probability distribution displayed in FIG. 14a corresponds to layers as they intersect a virtual vertical line passing through the actual tool position.

Figure 14B:
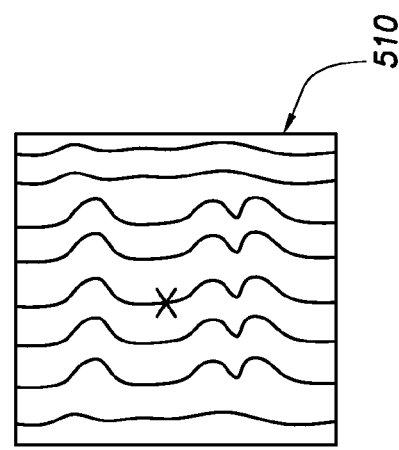
Figure 14C:
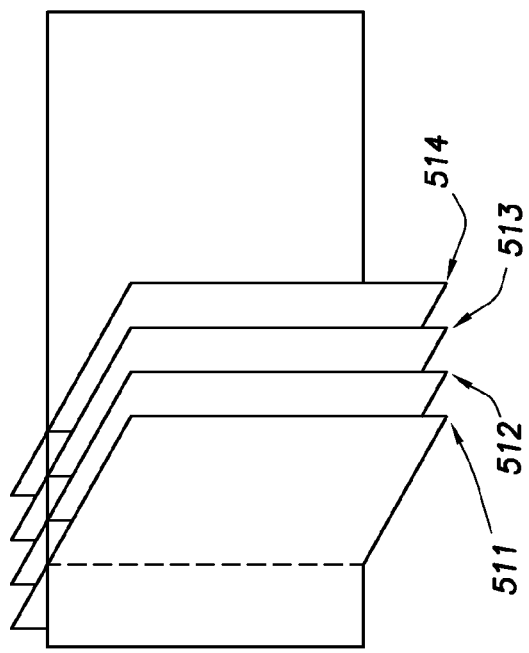
Figure 15:
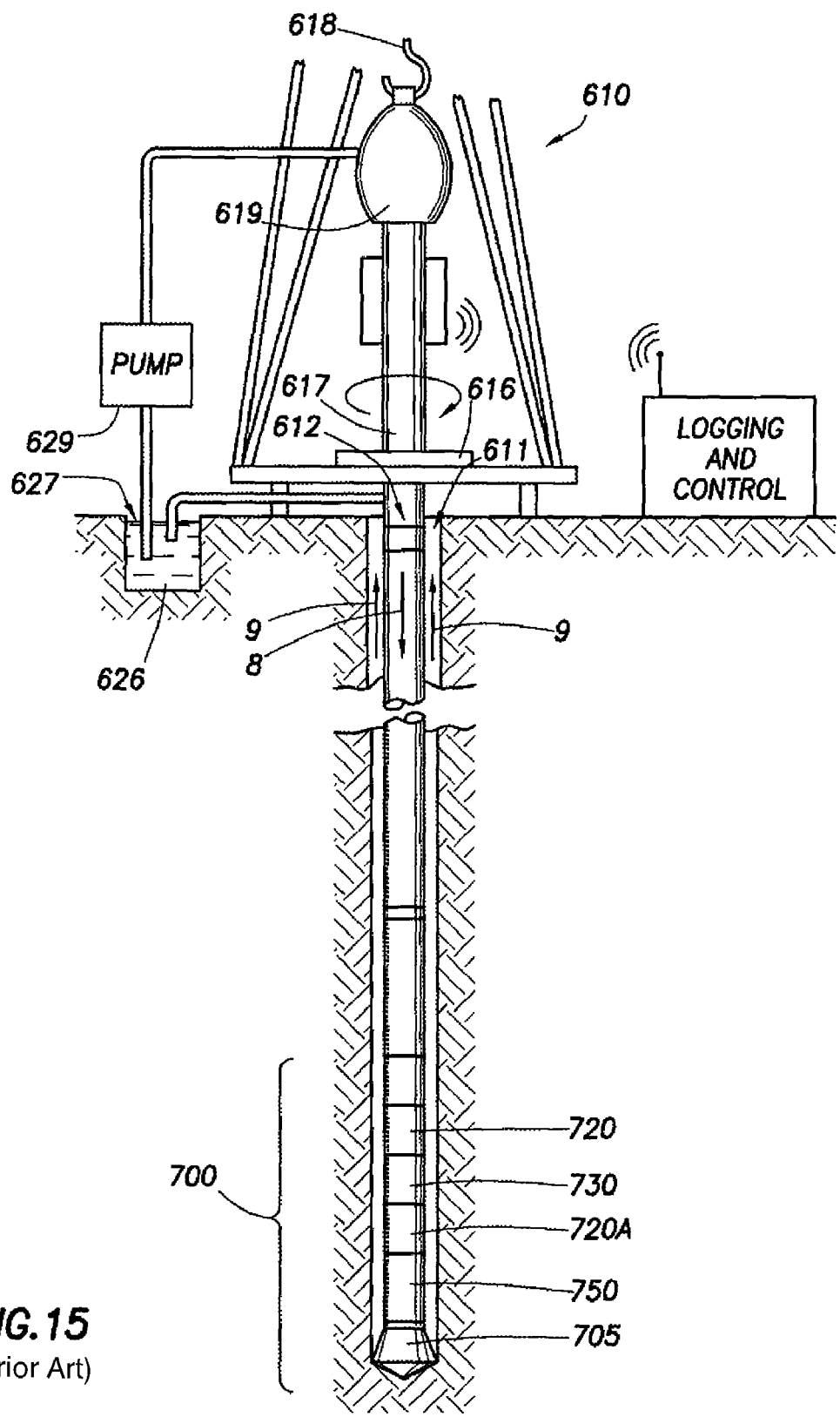
FIG. 15 illustrates a wellsite system in which the present invention can be employed.
Figure 16:
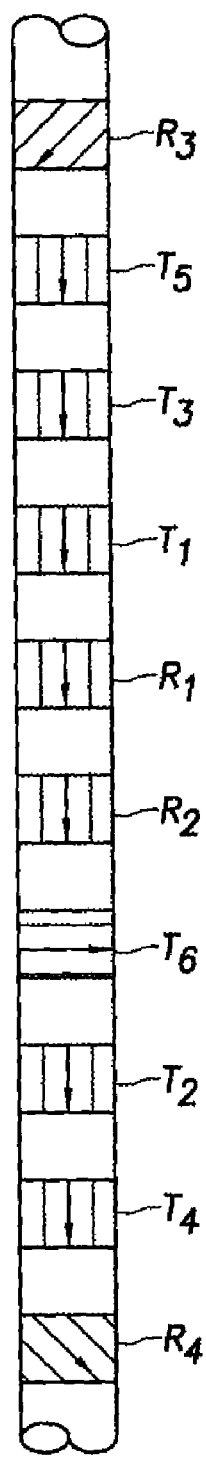
FIG. 16 depicts a directional deep-reading logging-while-drilling drilling tool, as part of the LWD tool or tools shown in FIG. 15.

It is also possible to extract a boundary position PDF intersecting a line within the plane 510, having an offset relative to the current tool position. That will take into account azimuthal sensitivity of the measurements. Putting together pseudo-seismic traces with different offsets will populate the plane 510 of FIG. 14b. If we now put together several planes of the kind of 510, like 511, 512, 513 etc. (see FIG. 14c), we are effectively populating a pseudo 3D seismic cube.

Figure 6:
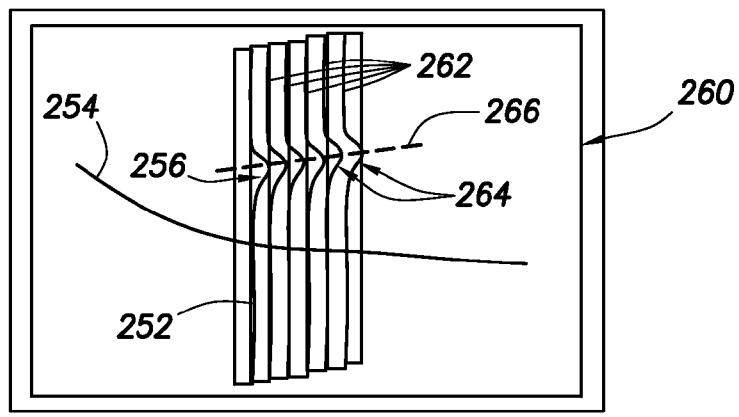
FIG. 6 is an exemplary display showing plots of a probability function at multiple borehole stations, resulting in a plurality of probability waveforms shown relative to the borehole path.

FIG. 6 illustrates a composite plot 260 that includes the initial waveform 252 of FIG. 5 as well as additional waveforms 262 taken at subsequent wellbore stations along the wellbore path 254. An appropriate scaling of the amplitudes of the probability waveforms 252, 262 may be used so that when a boundary is detected, the probability waveforms show a visual continuity from one wellbore station to the next. The scaling may be done using an independent parameter or a parameter that is a function of a formation property (see below). As a result, the waveforms 252, 262 have peaked sections 264 giving the visual suggestion of a boundary. The plot of probability waveforms may be interpreted in a fashion similar to that for seismic maps. For example, the plot may highlight specific horizons, such as top or bottom of the reservoir, fluid contacts, faults, reservoir lateral limits, or other physical features of the formation. In the illustrated embodiment, a dashed reference line 266 is fitted through the peaked sections 256, 264 to provide a visual representation of the boundary. The reference line 266 may also be used to estimate a dip angle of the boundary.

Figure 7:
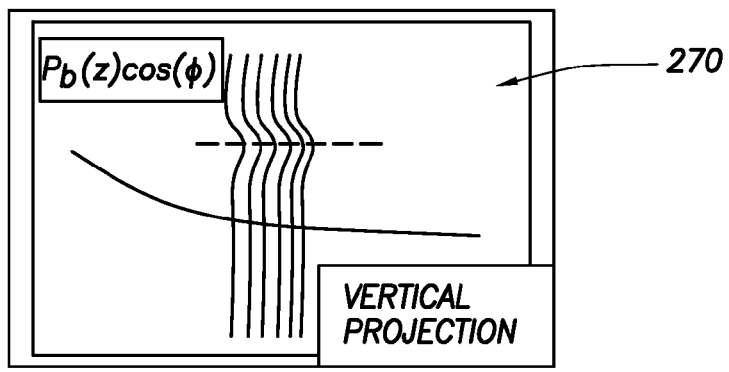
FIG. 7 is an exemplary display showing a vertical projection of the probability waveforms shown in FIG. 6.
Figure 8:
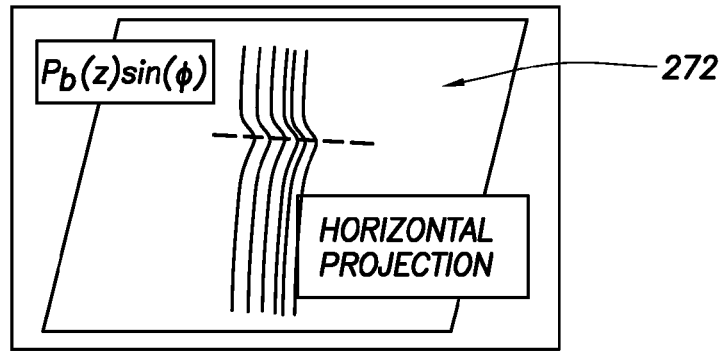
FIG. 8 is an exemplary display showing a horizontal projection of the probability waveforms shown in FIG. 6.

The azimuth or dip angle estimate may be used to generate a display that facilitates a three-dimensional visualization of the formation. An angle $\phi$ may be calculated which represents the angle between a line normal to the plane of the boundary and a vertical reference line. For the exemplary embodiment where the wellbore is substantially horizontal, the angle $\phi$ is less than 90 degrees when the boundary is above the wellbore and is greater than 90 degrees when the boundary is below the wellbore. With $\phi$ calculated, horizontal and vertical projections of the probability function may be generated. The vertical projection 270 is shown by plotting the function $p_b(z) \cos(\phi)$, and is illustrated at FIG. 7. The horizontal projection 272 is shown by plotting the function $p_b(z) \sin(\phi)$, and is illustrated at FIG. 8. One of ordinary skill in the art may use these two projections to generate a three-dimensional view of the probability functions, allowing a user to manipulate and interpret the data and its three-dimensional representation in a manner similar to that for seismic data. An exemplary three-dimensional representation 274 is illustrated at FIG. 9.

In addition to the position information provided by the foregoing plots, other attributes of the formation may also be displayed to enhance the visual interpretation of the data in real time. FIG. 10A illustrates an alternative display 280 showing scaled probability functions that indicate resistivity contrasts. The inversion process outputs boundary location estimates and resistivity estimates for each layer in the model. Consequently, a quantity $\delta R_{bed}/\delta z$ can be computed for each boundary estimation. This quantity is positive if the contrast of resistivity is positive and negative if the contrast of resistivity is negative, and may be used as a scaling parameter.

The function $p_b(z)(\delta R_{bed}/\delta z)$ is plotted in FIG. 10A and results in waveforms 282 having peaks that extend in both horizontal directions. As shown in FIG. 10A, each probability function waveform 282 includes first and second peaked sections 282a, 282b indicating the presence of first and second boundaries 283, 284 separating first, second, and third layers 285, 286, 287. Dashed boundary reference lines may be drawn along the apexes of the peaked sections 282a, 282b to provide a visual indication of the boundaries 283, 284. Moreover, each layer 285-287 has an associated resistivity R1-R3. In the exemplary embodiment, resistivity R1 of the first layer 285 is less than the resistivity R2 of the second layer 286. Additionally, the resistivity R3 of the third layer is less than the resistivity R2 of the second layer 286. As a result, the increase in resistivity from the first layer 285 to the second layer 286 results in a positive $\delta R_{bed}/\delta z$ quantity. Conversely, the decrease in resistivity from the second layer 286 to the third layer 287 results in a negative $\delta R_{bed}/\delta z$ quantity. This information may be illustrated by the horizontal directions in which the peaked section 282a, 282b of the probability function waveform 282 extend. In the illustrated embodiment, the peaked section 282a extends horizontally to the right to indicate a positive step change in resistivity, while the peaked section 282b extends horizontally to the left to indicate a negative step change.

Figure 11:
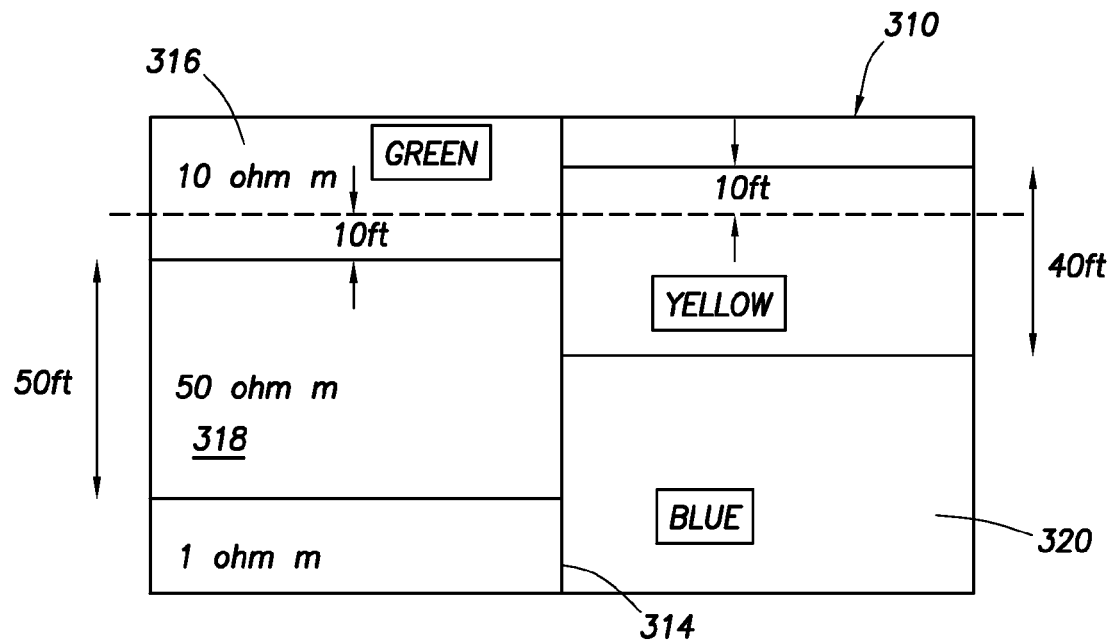
FIG. 11 is a hypothetical model of a formation in which a borehole traverses a vertical fault.
Figure 12:
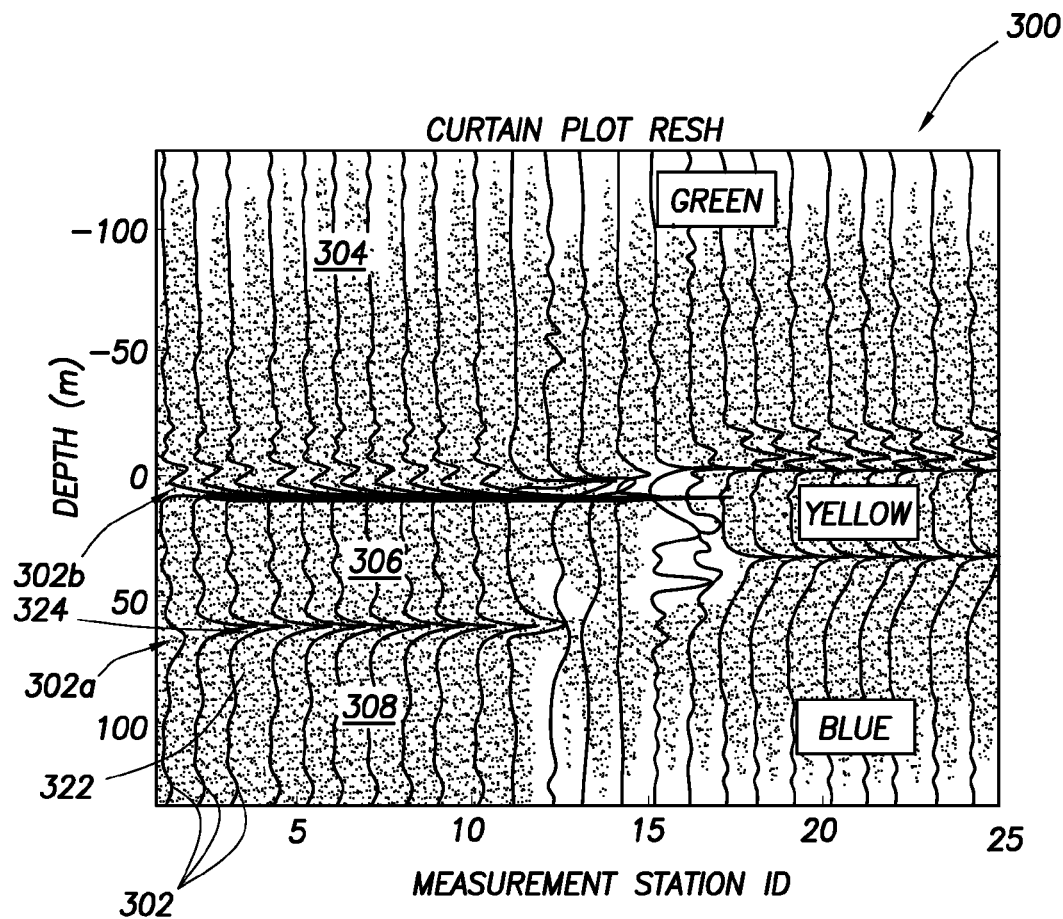
FIG. 12 is an exemplary display showing plots of a probability function at multiple borehole stations and including a visual representation of an additional attribute of the formation superimposed thereon.

A combined display 300 for simultaneously showing multiple formation attributes is illustrated at FIG. 12. In the illustrated embodiment, a plurality of probability waveforms 302 are superimposed on a bed resistivity estimate on the same TVD measured depth scale. The probability waveforms 302 include peaked sections 302a, 302b that identify boundaries between bed layers. In the illustrated embodiment, the estimated bed resistivities are displayed as different background colors on the display 300. The resistivity information may be obtained from a model of the formation. FIG. 11 is a visual representation 310 of a formation having a vertical fault 314. The model provides estimates of the resistivities of each layer. In the illustrated embodiment, the model estimates an upper layer 316 having a resistivity of approximately 10 ohm-m, an intermediate layer 318 having a resistivity of approximately 50 ohm-m, and a lower layer 320 having a resistivity of approximately 1 ohm-m. The model 310 also assigns background colors to the layers 316, 318, 320 to identify the different resistivities.

The resistivity estimates may also be presented on the combined display 300. Accordingly, the combined display shows resistivity of an upper bed layer 304 using a first color (such as green), an intermediate bed layer 306 using a second color (such as yellow), and a lower bed layer 308 using a third color (such as blue). The exemplary combined display 300, therefore, provides information on both boundary location and bed resistivity. It will be appreciated, however, that the display 300 may provide information on other attributes or combinations of attributes without departing from the scope of this disclosure.

Yet additional attributes may be embedded on the original plot of the probability waveforms. The combined display 300 of FIG. 12 uses background shading near the peaked sections to identify additional attributes of the formation. For example, the area 322 below the probability function and above a given threshold may be shaded one color for a positive waveform and/or the area 324 above the probability function and below a given threshold may be shaded differently for a negative waveform. In the illustrated embodiment, the areas 322, 324 of the combined display 300 are shaded lighter to indicate additional information. The shading may represent an attribute of the formation such as the azimuth of a boundary. One of ordinary skill in the art will appreciate, however, that the shading may be used to indicate other attributes that are relevant to geosteering, to the quality of the data, or to other geological information that can be used to affect the shape or the color of the waveforms As also shown in FIG. 10B, the probability function may be displayed with a defined portion of the area under the curve shaded. The combined display 300 may also be produced by superimposing a curtain plot onto the map.

Figure 13:
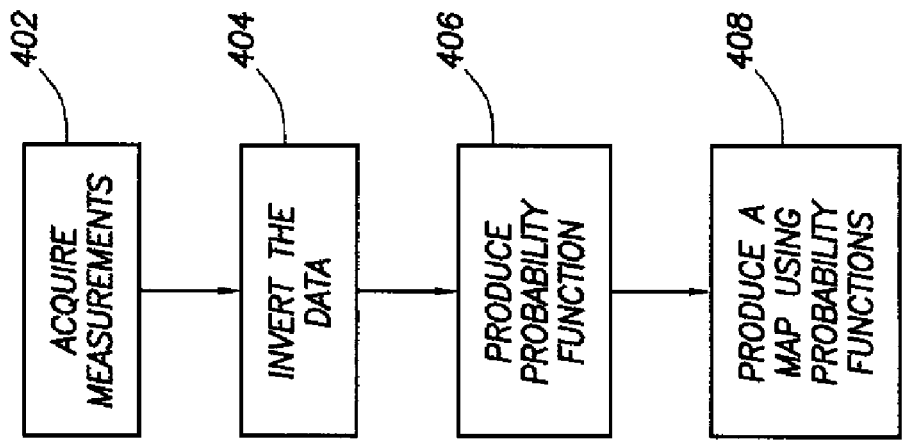
FIG. 13 is a flowchart showing the steps of one embodiment of the invention.
Figure 2:
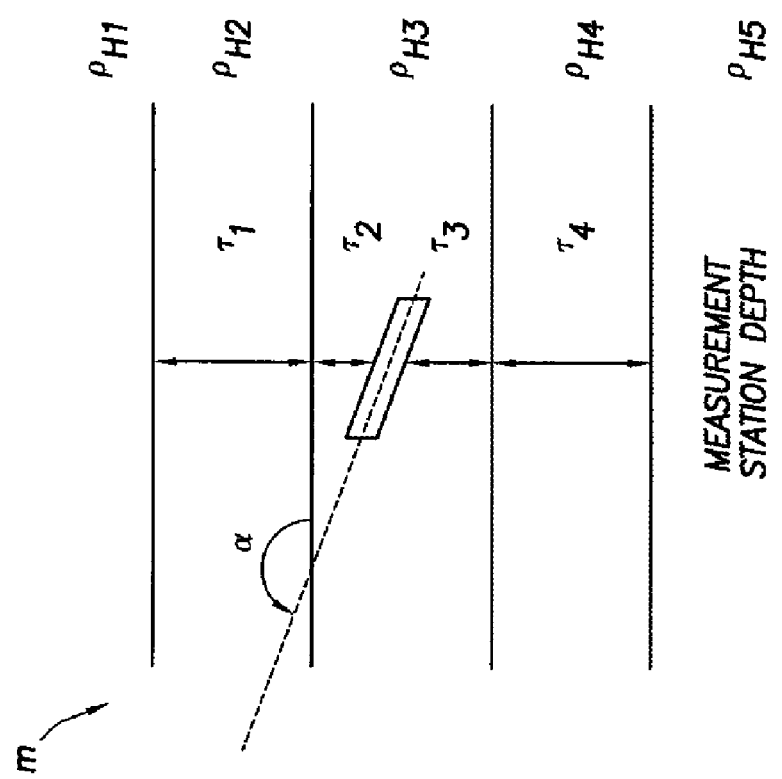

FIG. 13 shows a flowchart summarizing the steps taken for one embodiment of the invention. Box 402 represents the step of acquiring measurements. For example, resistivity logging, magnetic resonance logging, acoustic logging, and/or dielectric permittivity logging may be done to acquire the data. The data is inverted (Box 404) using inversion methods known in the art. For example, Bayesian inversion or Gauss-Newton inversion may be used. From the inverted data, a probability distribution function (pdf) is produced (Box 406). A map is produced using the pdf (Box 408).

While only certain embodiments have been set forth, alternatives and modifications will be apparent from the above description to those skilled in the art. These and other alternatives are considered equivalents and within the scope of this disclosure and the appended claims.

What is claimed is:

1. A method to produce a map of a subsurface earth formation penetrated by a wellbore, comprising:
   measuring a physical characteristic of the formation at two or more stations within the wellbore;
   deriving, for at least two wellbore stations, probability density functions; and
   producing the map by juxtaposing the probability density functions and plotting the juxtaposed probability density functions, wherein the map is a plurality of probability density functions.

2. The method of claim 1, wherein the map is 2-dimensional or 3-dimensional.

3. The method of claim 1, wherein the probability density functions are related to a formation property or a function of the formation property.

4. The method of claim 1, wherein the measuring the physical characteristic includes resistivity logging, magnetic resonance logging, acoustic logging, and dielectric permittivity logging.

5. The method of claim 1, wherein the deriving uses an inversion.

6. The method of claim 1, wherein the amplitude of the probability density function for a given location in the formation is proportional to the likelihood of one of the boundaries being located at that location.

7. The method of claim 1, wherein the producing includes displaying a projection of the wellbore onto the map.

8. The method of claim 7, further comprising using the map to make geosteering operation decisions.

9. The method of claim 1, further comprising scaling each probability density function by a parameter.

10. The method of claim 9, wherein the parameter is a function of a formation property.

11. The method of claim 1, wherein the producing includes displaying each of the probability density functions with a defined portion of the area below the curve of the probability density function shaded.

12. The method of claim 1, further comprising embedding additional information onto the map.

13. The method of claim 12, wherein the embedding includes superimposing a curtain plot or using shading, hue, or saturation.

14. The method of claim 1, further comprising projecting the probability density functions onto one or more desired planes.

15. The method of claim 14, further comprising using at least two projections to produce a 3-dimensional map.

16. The method of claim 1, wherein the width of a peak of the probability density function provides a measure of the uncertainty of the probability.

17. The method of claim 1, further comprising estimating a dip of the formation using the map.

18. The method of claim 1, further comprising estimating formation properties using the map.

19. A method to produce a map of one or more boundaries in a subsurface earth formation penetrated by a wellbore, comprising:
   measuring a physical characteristic of the formation at two or more stations within the wellbore;
   deriving, for at least two wellbore stations, probability density functions for the one or more boundaries; and
   producing the map of the one or more boundaries by juxtaposing the probability density functions and plotting the juxtaposed probability density functions, wherein the map is a plurality of probability density functions.

20. The method of claim 19, wherein the map is 2-dimensional or 3-dimensional.

21. The method of claim 19, wherein the one or more boundaries includes at least one of a reservoir top surface, a reservoir bottom surface, an interface between oil and water layers, an interface between gas and water layers, and an interface between gas and oil layers.

22. The method of claim 19, wherein the measuring the physical characteristic includes resistivity logging, magnetic resonance logging, acoustic logging, and dielectric permittivity logging.

23. The method of claim 19, wherein the deriving uses an inversion.

24. The method of claim 19, wherein the amplitude of the probability density function for a given location in the formation is proportional to the likelihood of one of the boundaries being located at that location.

25. The method of claim 19, wherein the producing includes displaying a projection of the wellbore onto the map.

26. The method of claim 25, further comprising using the map to make geosteering operation decisions.

27. The method of claim 19, further comprising scaling the probability density function by a parameter.

28. The method of claim 27, wherein the parameter is a function of a formation property.

29. The method of claim 19, wherein the producing includes displaying each of the probability density functions with a defined portion of the area below the curve of the probability density function shaded.

30. The method of claim 19, further comprising embedding additional information onto the map.

31. The method of claim 30, wherein the embedding includes superimposing a curtain plot or using shading, hue, or saturation.

32. The method of claim 19, further comprising projecting the probability density functions onto one or more desired planes.

33. The method of claim 32, further comprising using at least two projections to produce a 3-dimensional map.

34. The method of claim 19, wherein the width of a peak of the probability density function provides a measure of the uncertainty of the probability.

35. The method of claim 19, further comprising estimating a dip of the formation using the map.

36. The method of claim 19, further comprising estimating formation properties using the map.

* * * * *